(12) United States Patent
Weinstein

(10) Patent No.: US 7,862,408 B1
(45) Date of Patent: Jan. 4, 2011

(54) MEAT TENDERIZER WITH DISPOSABLE FACE PLATES

(76) Inventor: Cori Weinstein, P.O. Box 275, Rock Hill, NY (US) 12775

( * ) Notice: Subject to any disclaimer, the term of this patent is extended or adjusted under 35 U.S.C. 154(b) by 0 days.

(21) Appl. No.: 12/070,284

(22) Filed: Feb. 14, 2008

(51) Int. Cl.
*A22C 9/00* (2006.01)
*A22C 7/00* (2006.01)

(52) U.S. Cl. .................. 452/146; 452/102; 452/141; 81/25

(58) Field of Classification Search ......... 452/102–103, 452/141–147; 81/25
See application file for complete search history.

(56) References Cited

U.S. PATENT DOCUMENTS

| | | | | |
|---|---|---|---|---|
| 124,383 | A * | 3/1872 | Pettes | 452/146 |
| 495,607 | A * | 4/1893 | Barney | 81/19 |
| 608,455 | A | 8/1898 | Gwinner | |
| 1,103,132 | A * | 7/1914 | Deininger | 30/164.7 |
| 1,202,496 | A * | 10/1916 | Ericksen | 452/146 |
| 1,996,949 | A | 4/1935 | Bosworth et al. | 17/30 |
| 2,184,450 | A | 12/1939 | Elliott | 17/30 |
| 2,392,036 | A * | 1/1946 | Fleming | 452/146 |
| 2,422,005 | A | 6/1947 | Frank | 30/272 |
| 3,322,172 | A * | 5/1967 | Small | 81/19 |
| 3,581,651 | A * | 6/1971 | Johnson | 99/535 |
| 3,772,737 | A * | 11/1973 | Fleiss | 452/146 |
| 4,924,576 | A * | 5/1990 | Schiller | 30/358 |
| 5,255,575 | A | 10/1993 | Williams | 81/25 |
| D347,367 | S | 5/1994 | Li | D7/682 |
| 5,593,346 | A * | 1/1997 | Washington | 452/146 |
| 6,997,796 | B1 * | 2/2006 | Wangler | 452/102 |

* cited by examiner

*Primary Examiner*—David J Parsley
(74) *Attorney, Agent, or Firm*—Sandra M. Kotin

(57) ABSTRACT

A meat tenderizer with disposable face plates requires that a fresh face plate be chosen for each use to prevent cross contamination from one use of the tenderizer to the next. The table or tables of the tenderizer head are flat and accept the face plates which may have a flat tenderizing surface or any of several textured tenderizing surfaces. The face plates are intended for a single use. Once used a face plate is discarded. The user selects the appropriate face plate for the task at hand, attaches it to the tenderizer and removes and discards it after use. Since a clean unused face plate is selected for each use, the tenderizer does not have to be washed between uses thereby saving time for the chef and providing a sanitary tenderizing surface for contact with the meat.

4 Claims, 4 Drawing Sheets

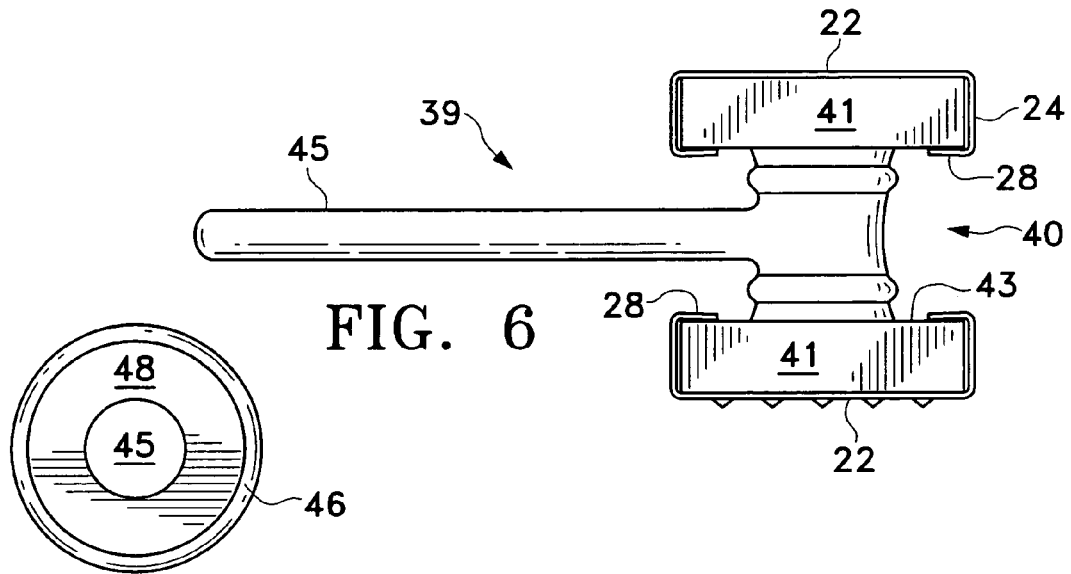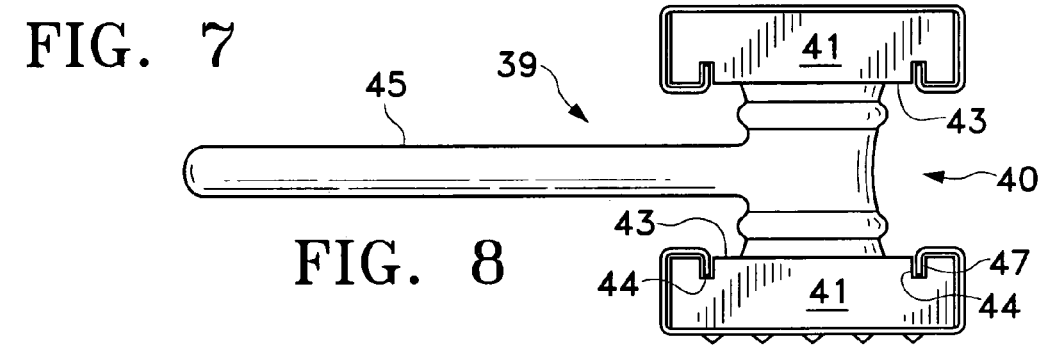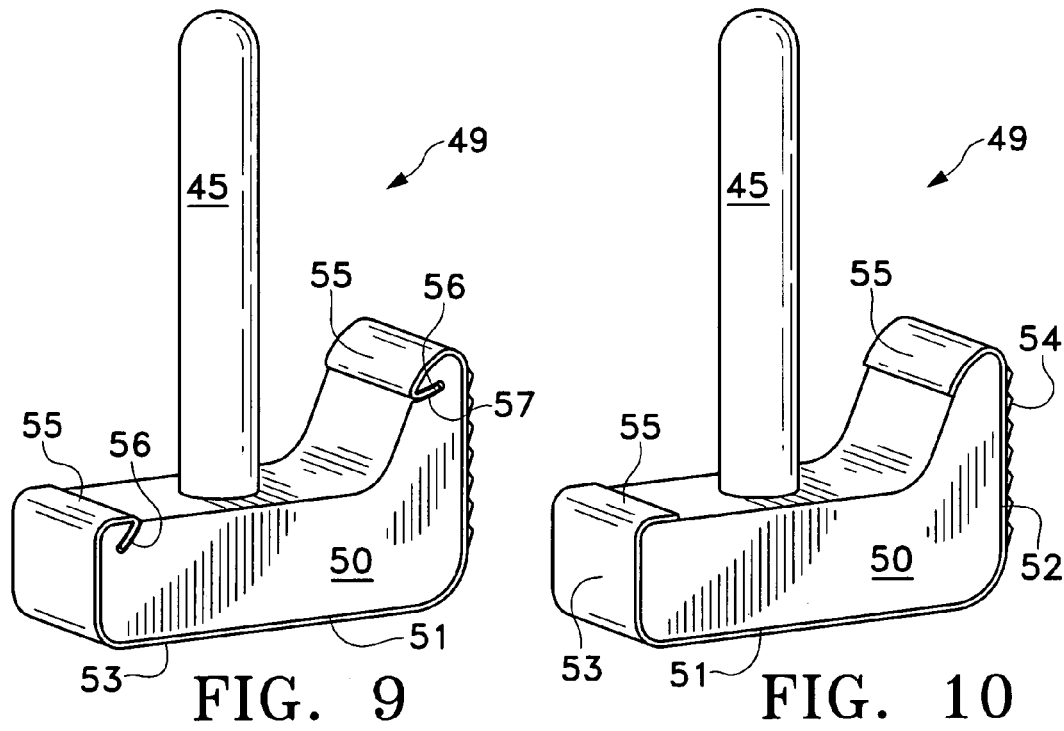

MEAT TENDERIZER WITH DISPOSABLE FACE PLATES

FIELD OF THE INVENTION

The instant invention relates to a meat tenderizer capable of accepting a selection of disposable face plates, each of which is discarded after a single use.

BACKGROUND THE INVENTION

The technique of pounding meat to make it more tender has probably been known as long as man has prepared meat for food. Today, in most restaurants and many homes, various cuts of meat are pounded by a meat tenderizer of one of several designs. Some meat tenderizers have multiple faces so the user can select the one best suited to a particular cut of meat, type of meat, or the dish being prepared. Other designs of meat tenderizer may have only one or two faces.

An examination of the prior art of meat tenderizers reveals a design patent for a meat hammer having three faces, one flat and the other two having different textures that are common to this type of utensil. (U.S. Pat. No. Des. 347,367)

In a patent issued in 1898 Gwinner teaches a combined meat saw and tenderizer having two changeable tenderizing blades in addition to the saw. The blades are curved and can be rocked back and forth over the meat. (U.S. Pat. No. 608,455) In U.S. Pat. No. 1,996,949 Bosworth et al. describes a meat tenderizer having two different heads, one consisting of knife blades oriented at different angles for cubing, and the other having the more common raised points for tenderizing. A similar device is taught by Elliott in U.S. Pat. No. 2,184,450. Elliott's bladed surface also has a spring loaded stripper plate to scrape bits of meat from the blades after use. Frank, in U.S. Pat. No. 2,422,005, discloses a vertical spring loaded chopping device that also has a tenderizing element.

A hammer having a series of interchangeable heads and tails is taught by Williams in U.S. Pat. No. 5,255,575. One of the choices for the hammer head is a meat tenderizing head.

Though many of the prior art devices have interchangeable heads or multiple pounding surfaces, none of these are disposable. The interchangeable heads can be removed and cleaned and the multiple surfaces can be cleaned, but all are an integral part of the device being used. The degree of cleaning achieved is dependent upon the person doing the cleaning as well as the configuration of the device itself.

In recent years the instances of contaminated meats and other foods have been increasing at a frightening rate. Though restaurants make every effort to maintain clean food preparation surfaces and utensils, bacteria may be present in purchased foods and using the same utensil for the preparation of one dish and then for another can easily spread contamination. Even if a utensil such as a meat tenderizer is constantly being washed, the many deep grooves and textures make it very difficult to remove all food particles. The busier the food preparation center the greater the chances of cross contamination and the less chance of having a utensil washed, or thoroughly washed, after every use. A meat tenderizer with its highly textured surfaces can be a very real source of contamination.

There is a need for a meat tenderizer, having disposable face plates that can be used once and then discarded. There is a need for a meat tenderizer having disposable face plates with a selection of different tenderizing surfaces to cover all possible food preparation requirements. There is a need for meat tenderizers of different configurations and designs to meet the physical requirements of different users, all having disposable face plates that are discarded after a single use.

BRIEF SUMMARY OF THE INVENTION

The present invention provides meat tenderizers of different designs, each having removable and disposable face plates, and a selection of face plates each having a different tenderizing surface.

It is an object of the present invention to provide a meat tenderizer that cannot spread contamination from one use to the next.

It is another object of the present invention to provide a single meat tenderizer that can have face plates with different surface configurations and textures to accommodate all tenderizing requirements.

Another object of the present invention is to provide a meat tenderizer that can be used in the busiest of food preparation centers with no risk of bacterial contamination.

A further object of the present invention is to provide a meat tenderizer that can be used in restaurants, large food preparation centers as well as in the home.

A still further object of the present invention is to provide a meat tenderizer with disposable face plates that are inexpensive, easy to attach and easy to remove.

It is also an object of the present invention to provide a meat tenderizer that is easy and inexpensive to manufacture.

Another object of the present invention is provide storage capabilities for the various face plates so they are close at hand and readily accessible.

The present invention is a meat tenderizer assembly that completely eliminates contamination from one use to the next. The tenderizer assembly comprises a head with at least one table that has a substantially planar outer surface, a handle integral with the head, and a series of disposable table covers configured to be quickly and easily snapped onto and removed from the at least one table and to remain attached to the at least one table during use, each of the table covers having a differently configured obverse surface for contact with the meat and a substantially smooth planar reverse surface for contact with the substantially planar outer surface of the at least one table. The invention also includes means for quickly and easily snapping the table covers onto and removing the table covers from the at least one table, the means comprising a first set of opposing side walls integral with the at least one tare a transverse downwardly facing groove disposed proximate to and upwardly spaced from the bottom of the table in each opposing side wall, a first set of comprising flanges integral with and curving upwardly from the obverse surface of the disposable table covers, the flanges terminating in inwardly and downwardly extending portions configured to cooperate with the grooves such that when a table cover is brought in contact with the at least one table in inwardly facing portions of the flanges of said table cover may be quickly and easily snapped into the grooves in the side walls of said at least one table, the tenderizer used in the intended manner, and the portions may be easily removed from the grooves after use; and means for prohibiting material from entering a space between the table covers and the at least one table during use. One table cover may be snapped onto the at least one table, the tenderizer used on a piece of meat, the used table cover quickly and easily removed and permanently discarded and a clean unused table cover snapped onto the at least one table for the next use thereby completely eliminating cross contamination from one use to the next.

The invention also includes a meat tenderizer assembly that completely eliminates contamination from one use to the next. The tenderizer assembly comprises a head with at least one table having a substantially planar outer surface and a first set and a second set of opposing sidewalls integral with the table, a transverse downward facing groove, disposed proximate to and upwardly spaced from the bottom of the at least one table, in each of the first set of opposing sidewalls, and a handle integral with the head. There are also a series of disposable table covers configured to be quickly and easily snapped onto and removed from the at least one table during use, each of the table covers having a differently configured obverse surface for contact with the meat and a substantially smooth planar reverse surface for contact with the substantially planar outer surface of the at least one table, means for quickly and easily snapping the table covers onto and removing the table covers from the at least one table that comprise a first set of opposing flanges integral with the obverse surface of the table cover and curving upwardly therefrom, the flanges terminating in inwardly and downwardly extending portions for cooperation with the downward facing grooves in the first set of opposing sidewalls of the at least one table and a second set of opposing flanges integral with the obverse surface of the table cover, curving upwardly therefrom for being disposed against the second set of opposing sidewalls of the at least one table, the second set of flanges are to cover a space between the table cover and the at least one table to prohibit material from entering the space. One table cover may be snapped onto the at least one table, the tenderizer used on a piece of meat, the used table cover quickly and easily removed and permanently discarded and a clean unused table cover snapped onto the at least one table for the next use thereby completely eliminating cross contamination from one use to the next.

The present invention is also a sanitary and time saving method of tenderizing meat. The method comprises the steps of selecting the meat to be tenderized, obtaining a meat tenderizer which comprises a head with at least one table having an outer surface, a handle integral with the head, and a series of disposable face plates for reversible attachment over the outer surface of the at least one table and choosing one of the disposable face plates. The method includes attaching the chosen face plate over the outer surface of the table; tenderizing the meat by pounding the meat with the tenderizer such that the face plate makes contact with the meat; removing and discarding the face plate; selecting another piece of meat to be tenderized, choosing a new face plate and tenderizing the meat by pounding the meat with the tenderizer such that the face plate makes contact with the meat. A fresh face plate is chosen for each use and each successive used face plate is removed and discarded thereby eliminating any cross contamination from one piece of meat to the next without the need to take time to wash the meat tenderizer between uses.

Other features and advantages of the invention will be seen from the following description and drawings.

BRIEF DESCRIPTION OF THE DRAWINGS

FIG. 6 is a side plan view of a second form of meat tenderizer with two faces, each fitted with a disposable face plate;

FIG. 7 is a top plan view of a round tenderizer head with a disposable face plate having a circular retention flange;

FIG. 8 is a side plan view of the second form of meat tenderizer using a different face plate retention means;

FIG. 9 is side perspective view of a third, form of meat tenderizer with a face plate;

FIG. 10 is a side perspective view of the meat tenderizer of FIG. 9 using a different face plate retention means;

DETAILED DESCRIPTION OF THE INVENTION

Figure 1:
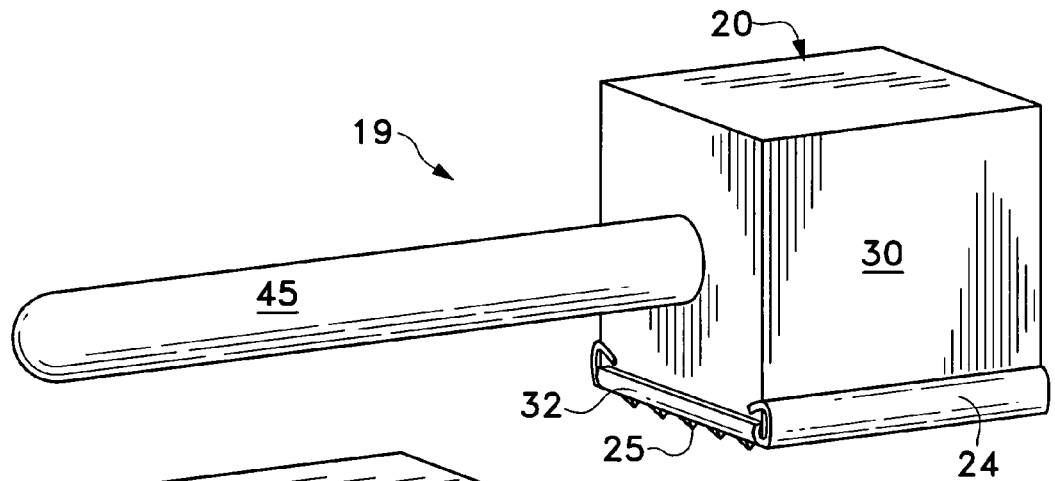
FIG. 1 is a side perspective view of one form of meat tenderizer incorporating a disposable face plate of the present invention.
Figure 11:
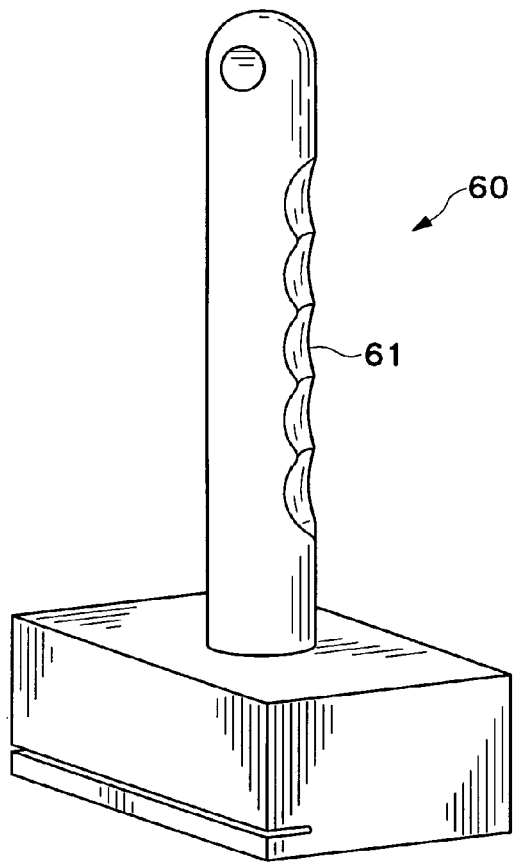
FIG. 11 is a side perspective view of another form of meat tenderizer having an ergonomic handle.

There are a number of different forms and styles of meat tenderizers on the market today. Some are of the mallet type and are wielded in the same manner as a hammer while others are used by holding the handle vertically and pounding in an up and down motion. All of the meat tenderizers may be adapted to accommodate disposable face plates. The various meat tenderizers may be made of wood, metal, or a polymeric material. The handle may be a separate part or manufactured integrally with the head. The meat tenderizer of the present invention must be strong, able to sustain constant pounding and designed to accept disposable face plates. This meat tenderizer may also be dishwasher safe thereby providing additional hygiene. FIG. 1 may be illustrative of a mallet form of meat tenderizer 19. FIGS. 6, 9 and 11 may provide some of the other forms.

Some mallet tenderizers, not illustrated here, may have a head in the form of a rectangular solid with four different usable surfaces, each having a different surface texture. The one mallet may be used for a variety of different purposes, for various cuts of meat, and with different kinds of meat. Unfortunately, this type of tenderizer may lend itself to multiple uses without being washed, or at least thoroughly washed, between uses and can be a source of cross contamination.

Figure 2:
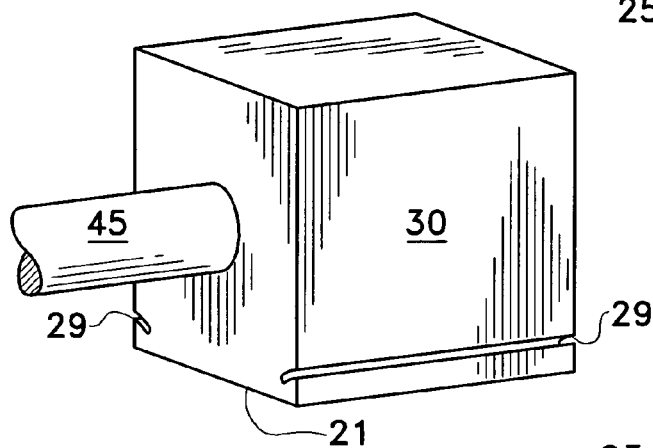
FIG. 2 is side plan view of the tenderizer without the face plate.

The head 20 of the mallet form 19 of meat tenderizer seen in FIGS. 1 and 2 may easily be made to accommodate the disposable face plates of the present invention. The face plates may all fit over the same surface of the head 20 and may be able to be attached quickly, removed just as quickly, and remain securely affixed during use. By supplying a selection of face plates with different tenderizing surfaces, a single meat tenderizer according to the present invention may pre sent more than four choices of tenderizing surfaces.

The bottom surface 21 of the head 20 may be flat to provide the maximum surface contact when the meat is pounded. The disposable face plates may be made to fit over the bottom surface 21 of the head. There may be a downward facing groove 29 along the lower portion of each of two opposing side faces 30 of the head 20 for the retention of the disposable face plates.

The face plates may have an outer surface 22, an inner surface 23 and two opposing side walls 24. The inner surface 23 may be flat so it may make intimate contact with the bottom surface 21 of the head 20. The better this contact, the less the chance of air pockets or food particles coming between the face plate and head surface which could cause the face plate to become dislodged during use.

Opposing side walls 24 of the face plates may be integral with the inner surface 23 and outer surface 22 and may extend upward so they may rest against opposing side faces 30 of the head. There may be an inward facing flange 28 along the top edge of each side wall 24 to cooperate with the downward facing grooves 29 in the two opposing side faces 30 of the head. When the face plate is to be seated on the head 20 the inner surface 23 of the face plate may be placed against the bottom surface 21 of the head 20 and the two side wall flanges 28 snapped into the two grooves 29 in the side faces 30. To remove the face plate the user may pull back on one side wall 24 and snap it off the head 20. To facilitate the removal of the face plate, there may be a tab 31 on the edge of one side wall 24. This tab 31 may be seen in FIG. 4.

Figure 3:
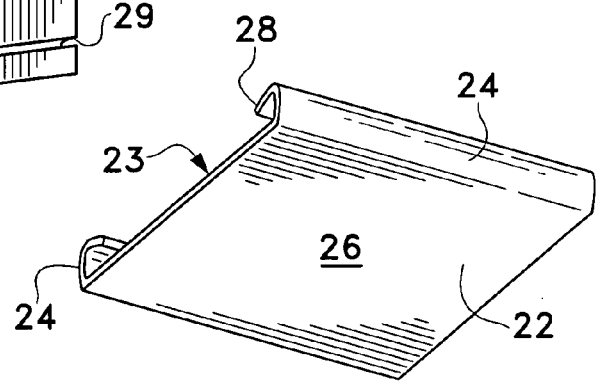
FIG. 3 is a bottom perspective view of a disposable face plate with a flat work surface.
Figure 5:
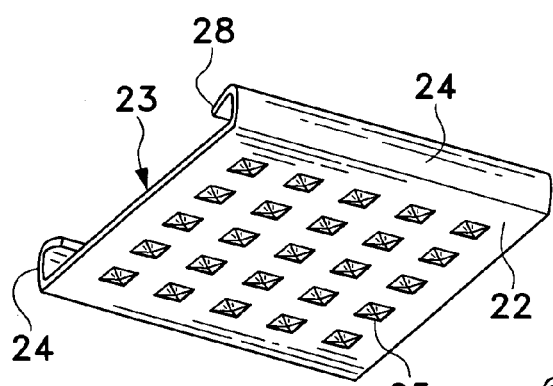
FIG. 5 is a bottom perspective view of a disposable face plate with a series of raised points on the work surface.
Figure 4:
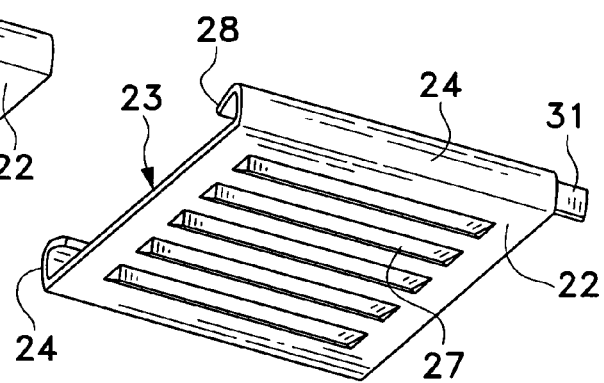
FIG. 4 is a bottom perspective view of a disposable face plate with a ridged work surface.

The outer surface 22 of one face plate may be planar and a variety of other face plates may be made, each with a different outer surface texture, so that all needs of the user may be met. One typical texture may be a series of raised points 25, often more like pyramids, as seen in FIG. 5. The points 25 may be small and very close together or larger, protrude higher above the surface and lie farther apart. Each type may impart a different result to the meat being pounded. Another face plate may have a flat surface 26 for use when the meat is to be made thinner but does not have to be texturized. This may be seen in FIG. 3. A third typical tenderizing surface may be made up of linear protrusions 27, often with sharp edges, as seen in FIG. 4. With the present invention, many more textures may be used since one single head may accept any number of disposable face plates.

To insure that no material from the meat be introduced between the mallet surface and the face plate, there may be two additional secondary side walls 32 along the other two opposing edges of the face plate. These side walls 32 may be low and designed to just cover the space between the face plate and the mallet surface. One of the secondary side walls 32 may be seen in FIG. 1.

Another mallet type meat tenderizer 39 may be seen in FIGS. 6 and 8. The head 40 may consist of two distinct tables 41 or pounding surfaces. The handle 45 may be attached between the two tables 41. Both of these tables 41 may accommodate face plates, utilizing two different outer surface textures at the same time. To maintain the face plates on the tables 41 the flanges 28 of the face plate side walls 24 may overlay the edges of the inside surfaces, or undersides 43 of the tables 41 as seen in FIG. 6. In the alternative, there may be second flanges 47 at substantially right angles to the first flanges 42 which communicate with grooves 44 in the undersides of the tables 41. The tables of this style meat tenderizer may be round as well as square or rectangular. When the tables 48 are round, there may be a circular flange 46 along the top edge of a circular side wall of the disposable face plate. This circular flange 46 may extend over the edge of the table and over-lap the table as seen in FIG. 6.

Figure 12:
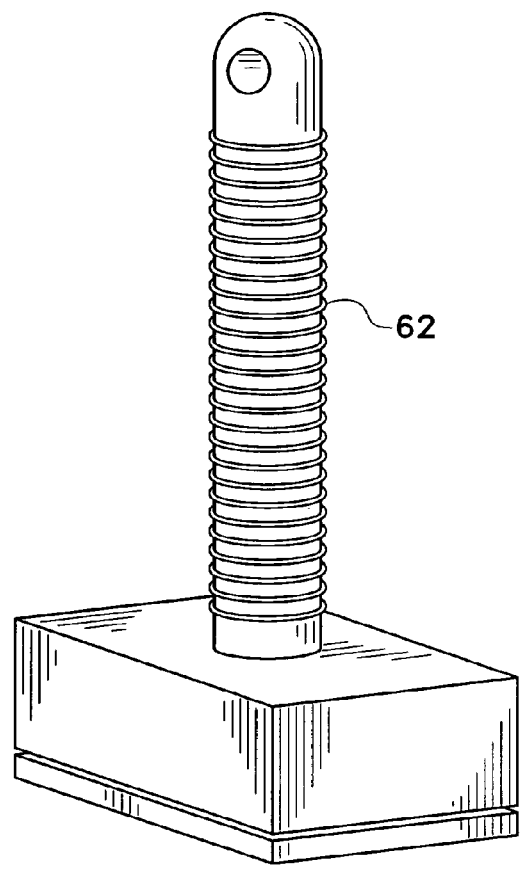
FIG. 12 is a side perspective view of the meat tenderizer of FIG. 11 with a non-slip handle.
Figure 13:
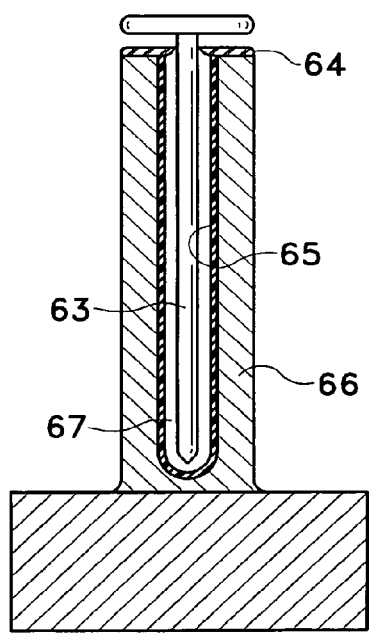
FIG. 13 is a side sectional view of a meat tenderizer with a compartment in the handle containing a meat thermometer.

Another form of meat tenderize 49 may have a handle attached at or near the center of the top surface of the head 50 with the pounding surface on the bottom of the head 50. The handle may be held in vertical orientation and the pounding effected in an up and down motion. Examples may be seen in FIGS. 11, 12 and 13.

A variation of this type may have two pounding surfaces, one on the bottom 51 and a second 52 at right angles to the first, on one side of the head, as may be seen in FIGS. 9 and 10. This tenderizer 49 may be used vertically when the bottom 51 is to be in contact with the meat and horizontally, like a hammer, when the second surface 52 is to be utilized. Since both contact surfaces are contiguous, one face plate may be used over both surfaces. This face plate may have two different surface textures 53 and 54. The two ends of the face plate may each have a flange 55 that extends over an end of the head surface for retention as seen in FIG. 10. There may also be second flanges 56, extending inward from the first, that communicate with grooves 57 in the inside surface of the tenderizer head 50 for a more secure retention. See FIG. 9.

The face plates of the present invention may also be retained by bands that extend over the tenderizer tables, by snaps on the inner surface that cooperate with openings in the table surface or by any other acceptable method known in the art. It may be important that the face plates have certain characteristics, i.e.: (1) be easy to attach; (2) will remain securely in place during the pounding; (3) be easy to remove and replace; and (4) be inexpensive. If any one of these characteristics is not present, the potential users will not want the product. Each face plate may be intended for a single use after which it may be discarded. Today, since the used face plates are discarded, it may also be essential that the face plates be manufactured from a biodegradable and/or recyclable material. The face plates may be made of a plastic or other polymeric material that is semi-rigid, pliable enough for the side walls and flanges to be fitted over the tenderizer heads and easily removed, but rigid enough to hold their shapes and so the texturizing protrusions remain intact when being pounded against the meat.

In addition to the utility of the disposable face plates, the meat tenderizers made according to the present invention may also have comfortable and easy to grasp handles. One type of handle, the straight handle 45, may be seen in FIGS. 5 through 9. The thickness and length of the handle may vary according to the type of head to which it may be attached. There may also be a slip-proof coating over the handle. The meat tenderizer of the present invention may also have an ergonomic handle that may make it fit the hand for a better grasp. The handle shown in FIG. 10 may have a contoured grip 60 with indentations 61 for the fingers. The handle shown in FIG. 11 may have a series of ridges 62 that form a non-slip grip. Both the ergonomic grip and the non-slip grip may be achieved by having a rubber or rubber-like grip applied over a straight handle, or the handle may be injection molded in the appropriate shape.

Another utensil that many chefs use frequently may be a quick-read meat thermometer 63. It may be advantageous to have a vertical compartment 62 within the handle 66 of the meat tenderizer to contain such a thermometer 63. The thermometer may be retained within the compartment 62 by means of a flexible cap 64 affixed to the top of the handle 66. The cap 64 may have a central opening through which the thermometer 63 may be inserted. The portion of the cap 64 surrounding the opening may form a circular flange to enable the thermometer to be inserted and removed easily but may act as a stop to prevent the thermometer from falling out or being displaced when the tenderizer is used. The cap 64 may be replaceable when it becomes stretched out and no longer functions properly. The compartment 62 may be lined with a plastic or other polymeric material 65 to cushion the thermometer 63.

Figure 14:
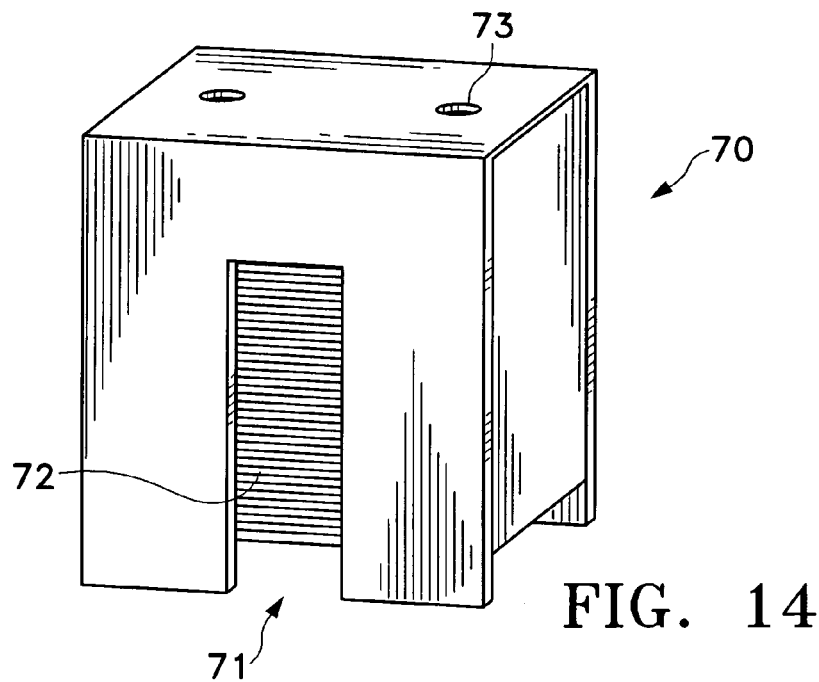
FIG. 14 is a front perspective view of a dispensing container for the disposable face plates.

A disposable face plate may only be a convenience if it is readily available to the chef. The face plates may be kept close to the work area in a dispensing container. One such container 70 may be seen in FIG. 14. There may be an opening 71 in the front wall of the container through which the series of face plates 72 may be visible and through which the user may reach to obtain a face plate. The container 70 may rest on a work surface close to the preparation area, it may be attached to the underside of a cabinet located above the work area, or attached to a wall close by. There may be openings 73 in the top surface of the container 70 to assist in attaching the container 70 to the cabinet or in the back (not illustrated) for attachment to a wall. A stack of face plates 72 may be inserted into the container 70 and removed one at a time as needed, much like drinking cups from a disposable cup holder.

Figure 15:
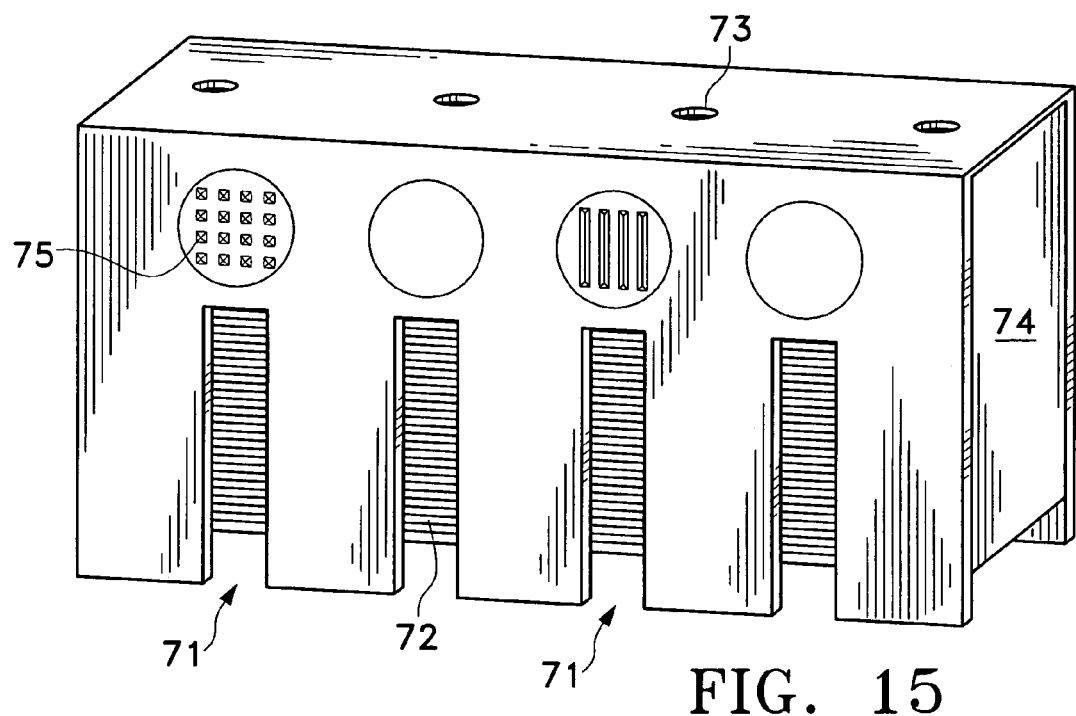
FIG. 15 is a front perspective view of a dispensing container holding several varieties of disposable face plates.

When variously textured face plates are used, a multiple chamber container 74 may accommodate the required variety of face plates. Each may have its own interior chamber and front opening through which the face plates may be accessed. There may be a sample face plate or picture 75 of a face plate above each opening so the user knows which face plate he is taking. See FIG. 15.

The meat tenderizer of the present invention may be marketed with an assortment of disposable face plates and a meat thermometer when the appropriate chamber is present. The dispensing container may be sold with it, or separately. The container may be sold with a supply of face plates and refills may be available in various quantities and assortments.

Though specific face plate textures have been described and illustrated for use with the present invention, any other face plate texture may be implemented. Novel face plates may expand the use of this common kitchen tool.

While several embodiments of the present invention have been illustrated and described in detail, it is to be understood that this invention is not limited thereto and may be otherwise practiced within the scope of the following claims.

I claim:

1. A meat tenderizer assembly that completely eliminates contamination from one use to the next, said tenderizer assembly comprising:
    a head with at least one table, said table having a substantially planar outer surface;
    a handle integral with said head;
    a series of disposable table covers configured to be quickly and easily snapped onto and removed from said at least one table and to remain attached to said at least one table during use, each of said table covers having a differently configured obverse surface for contact with the meat and a substantially smooth planar reverse surface for contact with the substantially planar outer surface of the at least one table;
    means for quickly and easily snapping said table covers onto and removing said table covers from said at least one table, said means comprising;
        a first set of opposing side walls integral with the at least one table, a transverse downwardly facing grove disposed proximate to and upwardly spaced from the bottom of the table in each opposing side wall, a first set of opposing flanges integral with and curving upwardly from the obverse surface of the disposable table covers, said flanges terminating in inwardly and downwardly extending portions configured to cooperate with said grooves such that when a table cover is brought in contact with the at least one table the inwardly facing portions of the flanges of said table cover may quickly and easily snapped into the grooves in the side walls of said at least one table, the tenderizer used in the intended manner, and said portions may be easily removed from said grooves after use; and
    means for prohibiting material from entering a space between the table covers and the at least one table during use;
    whereby one table cover may be snapped onto the at least one table, the tenderizer used on a piece of meat, the used table cover quickly and easily removed and permanently discarded and a clean unused table cover snapped unto the at least one table for the next use thereby completely eliminating cross contamination from one use to the next.

2. A meat tenderizer assembly as described in claim 1 further comprising a tab integral with one flange of the table covers, said tab to assist in the quick removal of the table cover after use.

3. A meat tenderizer assembly as described in claim 1 wherein the means for prohibiting material from entering the space between the table cover and the at least one table comprises a second set of opposing sidewalls integral with the at least one table and a second set of opposing flanges integral with and extending upwardly from the obverse surface of said table cover and being disposed against said second set of opposing side walls to enclose an area over which the first set of flanges does not extend.

4. A meat tenderizer assembly that completely eliminates contamination from one use to the next, said tenderizer assembly comprising:
    a head with at least one table, said table having a substantially planar outer surface and a first set and a second set of opposing sidewalls integral therewith;
    a transverse downward facing groove, disposed proximate to and upwardly spaced from the bottom of the at least one table, in each of the first set of opposing sidewalls;
    a handle integral with said head;
    a series of disposable table covers configured to be quickly and easily snapped onto and removed from said at least one table and to remain attached to said at least one table during use, each of said table covers having a differently configured obverse surface for contact with the meat and a substantially smooth planar reverse surface for contact with the substantially planar outer surface of the at least one table;
    means for quickly and easily snapping said table covers onto and removing said table covers from said at least one table, said means comprising a first set of opposing flanges integral with the obverse surface of the table cover and curving upwardly therefrom, said flanges terminating in inwardly and downwardly extending portions for cooperation with the downward facing grooves in the first set of opposing sidewalls of the at least one table; and
    a second set of opposing flanges integral with the obverse surface of said table cover and curving upwardly therefrom for being disposed against the second set of opposing sidewalls, said second set of flanges to cover a space between the table cover and the at least one table, to enclose an area over which the first set of flanges does not extend, and to prohibit material from entering the space;
    whereby one table cover may be snapped onto the at least one table, the tenderizer used on a piece of meat, the used table cover quickly and easily removed and permanently discarded and a clean unused table cover snapped onto the at least one table for the next use thereby completely eliminating cross contamination from one use to the next.

* * * * *